O. DUIS.
MOISTURE SUPPLYING DEVICE FOR CARBURETED AIR.
APPLICATION FILED JAN. 16, 1912.
1,043,080.
Patented Nov. 5, 1912.
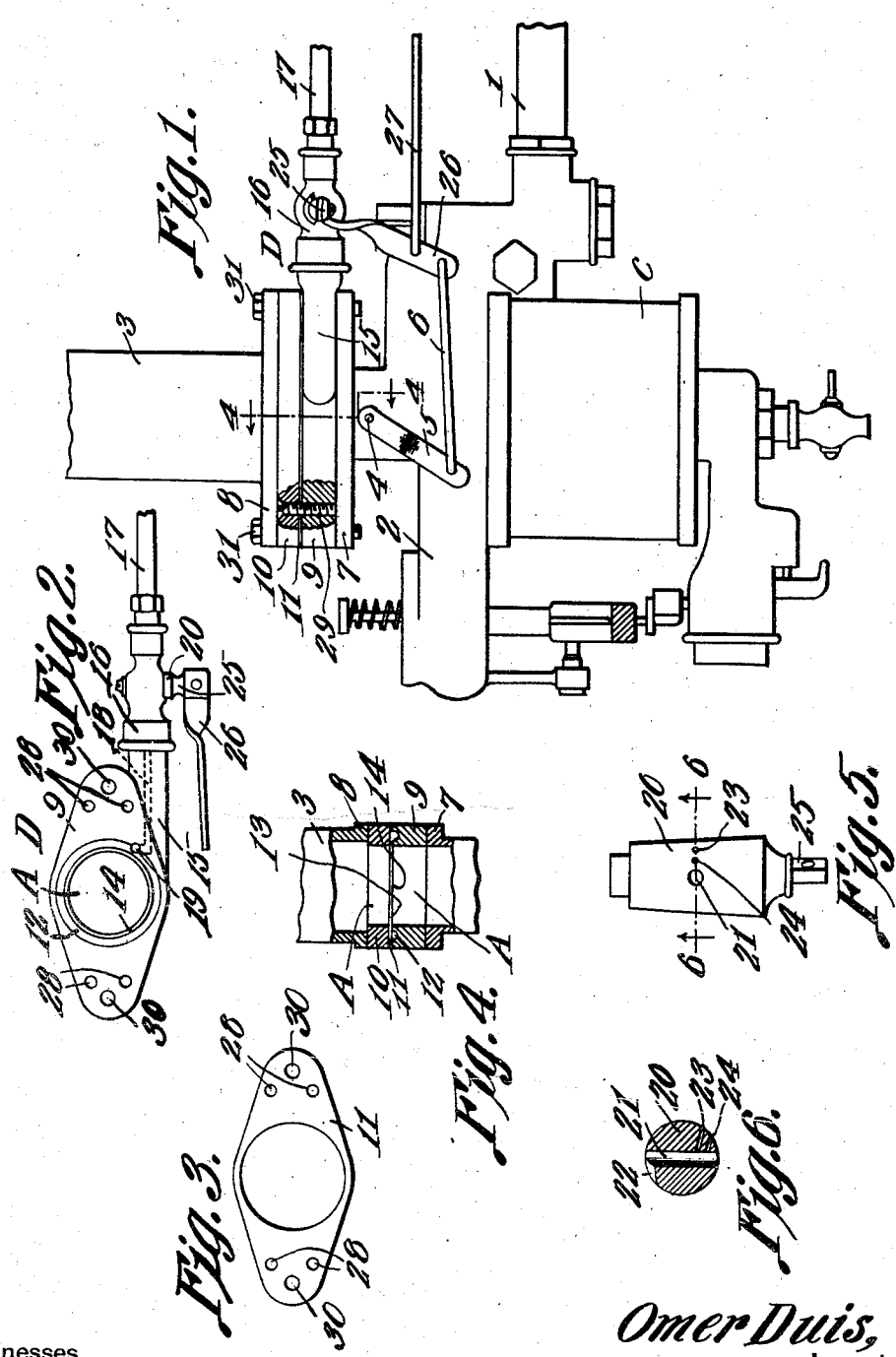
Witnesses
Omer Duis,
Inventor
by C. A. Snow & Co.
Attorneys

UNITED STATES PATENT OFFICE.

OMER DUIS, OF STREATOR, ILLINOIS, ASSIGNOR OF ONE-HALF TO ALBERT DUIS, OF STREATOR, ILLINOIS.

MOISTURE-SUPPLYING DEVICE FOR CARBURETED AIR.

1,043,080.  Specification of Letters Patent.  Patented Nov. 5, 1912.

Application filed January 16, 1912. Serial No. 671,517.

*To all whom it may concern:*

Be it known that I, OMER DUIS, a citizen of the United States, residing at Streator, in the county of La Salle and State of Illinois, have invented a new and useful Moisture-Supplying Device for Carbureted Air, of which the following is a specification.

The present invention relates to improvements in moisture supplying devices for carbureted air, the primary object of the invention being the provision of a device adapted to be interposed between the carbureter and the intake manifold of an explosive engine and supply a spray of vapor from a main water supply in a veil from circumferential points at the junction between the carbureter and the manifold, whereby the carbureted air formed by the carbureter and at its entrance to the manifold will be properly saturated with such moisture or vapor to provide a carbureted air that will not prematurely explode during the compression thereof in the engine cylinder, and at the same time provide a carbureted air that during the admission and explosion thereof will not so entirely consume the lubricating oil within the cylinder as to produce the undesirable residue or carbonization of the cylinder and piston.

A further object of the present invention is the provision of a moisture supplying nozzle adapted to be disposed as a connection between the carbureter and the intake manifold of an explosive engine, the same having an annular channel with an annular opening, whereby the veil of moisture is sprayed from various points throughout the circumference of such device toward the center, whereby the carbureted air entering the manifold will be thoroughly saturated as the same passes through the veil of moisture or vapor thus projected.

A still further object of the present invention is the provision of a moisture supplying device disposed at the junction of a carbureter and manifold, the said carbureter being provided with the usual throttle, while the said device for supplying the moisture with carbureted air after leaving the carbureter and before entering the manifold, is provided with a control valve which is connected in operable relation to the throttle valve of the carbureter, whereby the supply of moisture to the carbureters will be commensurate, or in proportion, to the carbureted air supplied to the manifold.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a side elevation of a carbureter and the lower portion of a manifold with the moisture supplying device in operable relation thereto. Fig. 2 is a top plan view of the lower member of the moisture supplying device. Fig. 3 is a bottom plan view of the upper member of said moisture supplying device. Fig. 4 is a section taken on line 4—4 of Fig. 1. Fig. 5 is a detail view of the valve for controlling the supply of moisture to the moisture supplying device. Fig. 6 is a section taken on line 6—6 of Fig. 5.

Referring to the drawings C designates the carbureter, which may be of any well known form, the same in the present instance being provided with the gasolene or fluid hydrocarbon supply pipe 1 and with the auxiliary air supply 2, a manifold or carbureted air intake conduit 3 being disposed above and in operable relation to the carbureter, said manifold as is usual leading to an explosive engine (not shown). The carbureter is provided with a usual throttle valve 4 which is operably connected to a crank arm 5 to which is connected a rod 6, the same to be operated simultaneously with the control of the moisture supplying device D, as will later appear.

The moisture supplying device D as clearly shown in Fig. 1 is disposed between the flanges 7 and 8 respectively of the carbureter and manifold and forms a connecting medium therebetween, the same being made in the same contour as said flanges and consisting of the lower member 9 and the upper member 10, both of which are provided with apertures A through which the carbureted air passing from the carbureter C may enter into the lower end of the manifold 3.

Mounted between the adjacent faces of the members 9 and 10 of the moisture supplying device D, is a thin gasket 11, while formed in the inner face of the member 9 adjacent to the inner face of the member 10, and about the aperture A, is an annular channel 12, whose edge 13 in combination with the gasket 11 provides the annular or circular outlet 14 for the channel 12 and consequently a spraying nozzle at the junction between the members 9 and 10 of the moisture supplying device D.

Formed integral with the lower member of the moisture supplying device D is a lug 15 which has connected thereto, the valve casing 16, said valve casing being interposed between the said projection 15 and the water supplying pipe 17, which receives its water from any means, preferably a tank (not shown). Formed in the projection 15 is the water inlet channel 18 which terminates in the outlet 19, so that the water led from the conduit or pipe 17 to the valve casing 16 and channel 18 will enter into the annular channel 12 of the member 9 and as the opening or nozzle 13 between the respective members 9 and 10, is so minute, a veil of vapor or moisture is sprayed inwardly from all points of the circumference of the aperture A of the moisture spraying device D, so that a veil of vapor or moisture is formed across the aperture A so that any carbureted air passing from the carbureter C into the manifold 3, will pass through the said veil of vapor or moisture and cause the said moisture to be thoroughly commingled with the carbureted air, thus saturating the carbureted air with moisture before the same is conducted into the manifold 3 and finally into the engine (not shown).

The valve 20 mounted in the valve casing 16 is made in the usual truncated conical shape as clearly shown in Figs. 5 and 6 but in the present instance is provided in addition to the main port or channel 21 with the end auxiliary port 22, and the two reduced ports 23 and 24 respectively, all of said ports 22, 23 and 24 leading into the main port 21 as clearly illustrated in Fig. 6, and so disposed that the supply of moisture from the pipe 17 to the channel 12, as the valve 20 is first turned, will first enter the port 22 pass through the port 21 and the first reduced port 23 and thus enter the channel 18 in a greatly reduced stream. A further movement of the valve 20 will bring the port 24 into alinement with the channel 18 thus increasing the supply of moisture to the moisture supplying device, or when the valve 20 is in channel opening position, the port 21 will be in the direct line with the bore of the conduit 17 and the channel 18, thus supplying the full amount of moisture desired, and especially so when the full supply of carbureted air is admitted by means of the throttle 4 to pass into the manifold 3.

In order to provide a simultaneous actuation of the throttle valve port 4 and the valve 20, the stem 25 of the valve 20 has connected thereto a crank 26, whose free end is connected to the rod 6 and consequently to the crank 5 of the throttle valve 4, so that the main throttle controlling rod 27, operated from any desired place, will move the crank 26 and valve 20 and simultaneously the throttle or throttle valve 4. By this means it will be seen that the supply of carbureted air to the manifold 3 and the supply of moisture to the moisture supplying device D are regulated to an exactness and in proportion to the amount of carbureted air supplied to the manifold 3.

From the foregoing description, taken in connection with the drawings, it is evident that a device of this character may be readily applied to any form of carbureter and at its junction with the manifold and that although shown as disposed in a horizontal position in the present instance, the same may be disposed at any angle but preferably adjacent to the outlet of the carbureter so as to produce the desired veil of vapor or moisture through which the carbureted air must pass before entrance to the manifold to thus thoroughly saturate the carbureted air with the proper quantity of water, thus providing an explosive mixture which will not prematurely explode due to the compression and heat in the engine and which will prevent to a great extent the carbonization of any oil, either the oil not properly mixed in the carbureted air or the lubricating oil within the cylinder. Further by reason of the peculiar form of valve for controlling the supply of moisture to the moisture supplying device, the said moisture may be regulated to an exactness and in the proper proportion to the amount of carbureted air being formed and admitted through the manifold to the engine.

What is claimed is:

1. The combination with a manifold and a carbureter for supplying carbureted air to said manifold, of means for supplying moisture to the carbureted air, consisting of an annular spraying nozzle disposed to discharge a veil of moisture across the manifold and through which the carbureted air passes.

2. The combination with a manifold and a carbureter for supplying carbureted air to said manifold, of means for supplying moisture to the carbureted air, consisting of a circular spraying nozzle provided with a circular inwardly projecting discharge outlet of substantially the same diameter as the diameter of the manifold, whereby a veil of moisture is projected across the space at the junction between the carbureter and manifold.

3. The combination with a carbureter and manifold, of a moisture supplying device disposed at the juncture between the carbureter and manifold, said device being a circular inwardly opening spraying nozzle of substantially the same diameter as the manifold, for spraying vapor toward the center of the nozzle to form a veil across the entrance to the manifold.

4. A moisture supplying device for carbureted air forming devices, comprising a body provided with an aperture therethrough, said body forming a connection between a carbureter and a manifold, and having an annularly disposed nozzle having an annular outlet at the circumference of the aperture of the body, and valve control means for supplying moisture to said nozzle.

5. The combination with a carbureter and a manifold, of a moisture supplying device disposed between the carbureter and manifold and forming a connection therebetween, said device being composed of two separable bodies, one of which is provided with an annular nozzle in the face adjacent the other body, the adjacent portions of the two bodies providing an annular outlet for the nozzle.

6. The combination with a carbureter and a manifold, of a moisture supplying device disposed between the carbureter and manifold and forming a connection therebetween, said device comprising two bodies provided with alined apertures in communication with the carbureter and manifold, one of said bodies having an annular recess in the face adjacent the other body, the abutting portions of both bodies forming an annular outlet for said annular recess and forming with the annular recess a nozzle, and means for supplying moisture through said annular channel.

7. The combination with a carbureter provided with a throttle valve, and a manifold, of a moisture supplying device forming a connection between the carbureter and manifold and provided with an aperture therethrough for the passage of the carbureted air from the carbureter into the manifold, said device being provided with an annular nozzle for supplying moisture at the junction between the carbureter and manifold, a valve for controlling the supply of moisture to said nozzle, and means for operably connecting the throttle of the carbureter and the valve of the moisture supplying device for simultaneous operation.

8. The combination with a carbureter provided with a throttle valve, and a manifold, of a moisture supplying device forming a connection between the carbureter and manifold and provided with an aperture therethrough for the passage of the carbureted air from the carbureter into the manifold, said device being provided with an annular nozzle for supplying moisture at the junction between the carbureter and manifold, a valve connection for conveying water to the nozzle of the moisture supplying device, means for operably connecting said valve of the connection to the throttle of the carbureter, and means for operating the throttle and valve coincidently.

9. The combination with a carbureter having a valve, and a manifold, of a moisture supplying device disposed between the carbureter and manifold and forming a connection therebetween, said device comprising two bodies provided with alined apertures in communication with the carbureter and manifold, one of said bodies having an annular recess in the face adjacent the other body, the abutting portions of both bodies forming an annular outlet for said annular recess and forming with the annular recess a nozzle, a conduit for supplying water to the nozzle of the moisture supplying device, a valve interposed therein provided with a main port having a plurality of reduced ports leading thereinto for varying the quantity of water supplied to the nozzle, and means for operably connecting said valves of the carbureter and device for simultaneous operation.

10. The combination with a carbureter and a manifold, of a moisture supplying device interposed between the carbureter and manifold and provided with an aperture therethrough, said device having a body formed in two sections, one of said sections being provided with an annular channel upon its face adjacent the face of the other member and surrounding the aperture through the body, a gasket disposed between the sections of the body and providing an annular moisture outlet leading from the annular channel into the aperture of the body, and means for supplying moisture to the annular channel.

11. The combination with a carbureter and a manifold, of a moisture supplying device interposed between the carbureter and manifold and provided with an aperture therethrough, said device having a body formed in two sections, one of said sections being provided with an annular channel upon its face adjacent the face of the other member and surrounding the aperture through the body, a gasket disposed between the sections of the body and providing an annular moisture outlet leading from the annular channel into the aperture of the body, a moisture supplying conduit leading into the body for supplying moisture to the annular channel thereof, and a valve mounted in said conduit for controlling the supply of moisture.

12. The combination with a carbureter and a manifold, of a moisture supplying device interposed between the carbureter and manifold and provided with an aperture therethrough, said device having a body formed in two sections, one of said sections being provided with an annular channel upon its face adjacent the face of the other member and surrounding the aperture through the body, a gasket disposed between the sections of the body and providing an annular moisture outlet leading from the annular channel into the aperture of the body, a conduit in communication with the annular channel for supplying moisture to said channel, and a valve mounted in said conduit provided with a main port and a plurality of auxiliary ports for controlling varying supplies of moisture to the annular channel.

13. The combination with a carbureter provided with a carbureted air throttle valve, and a manifold, of a moisture supplying device interposed between the carbureter and manifold and provided with a main passageway therethrough, said device having a body formed in two sections, one of said sections having an annular channel upon its face adjacent to the other section, said channel surrounding the passageway of the body, a gasket disposed between the sections of the body and providing an annular moisture outlet leading from the annular channel into the passageway, a moisture supplying conduit leading to the annular channel, a valve mounted thereon, and means for connecting said valve with the throttle valve for operating the throttle valve and moisture supply valve simultaneously.

14. The combination with a carbureter provided with a carbureted air throttle valve, and a manifold, of a moisture supplying device interposed between the carbureter and manifold and provided with a main passageway therethrough, said device having a body formed in two sections, one of said sections having an annular channel upon its face adjacent the face of the other section, said channel surrounding the passageway of the body, a gasket disposed between the sections of the body and providing an annular moisture outlet leading from the annular channel into the passageway, a moisture supplying conduit leading to the annular channel, a valve mounted therein, and means for connecting said valve with the throttle valve for operating the throttle valve and moisture supplying valve simultaneously, said moisture supplying valve being provided with a main port and a plurality of auxiliary ports, whereby moisture is supplied to the annular channel proportionate with the opening of the throttle valve of the carbureter.

In testimony that I claim the foregoing as my own, I have hereto affixed my signature in the presence of two witnesses.

OMER DUIS.

Witnesses:
  MAC HAGERTY,
  ALBERT DUIS.